May 22, 1962
B. L. JOHNSON
3,036,190
PAINT AND VARNISH SCRAPER
Filed Nov. 27, 1959
3 Sheets-Sheet 1
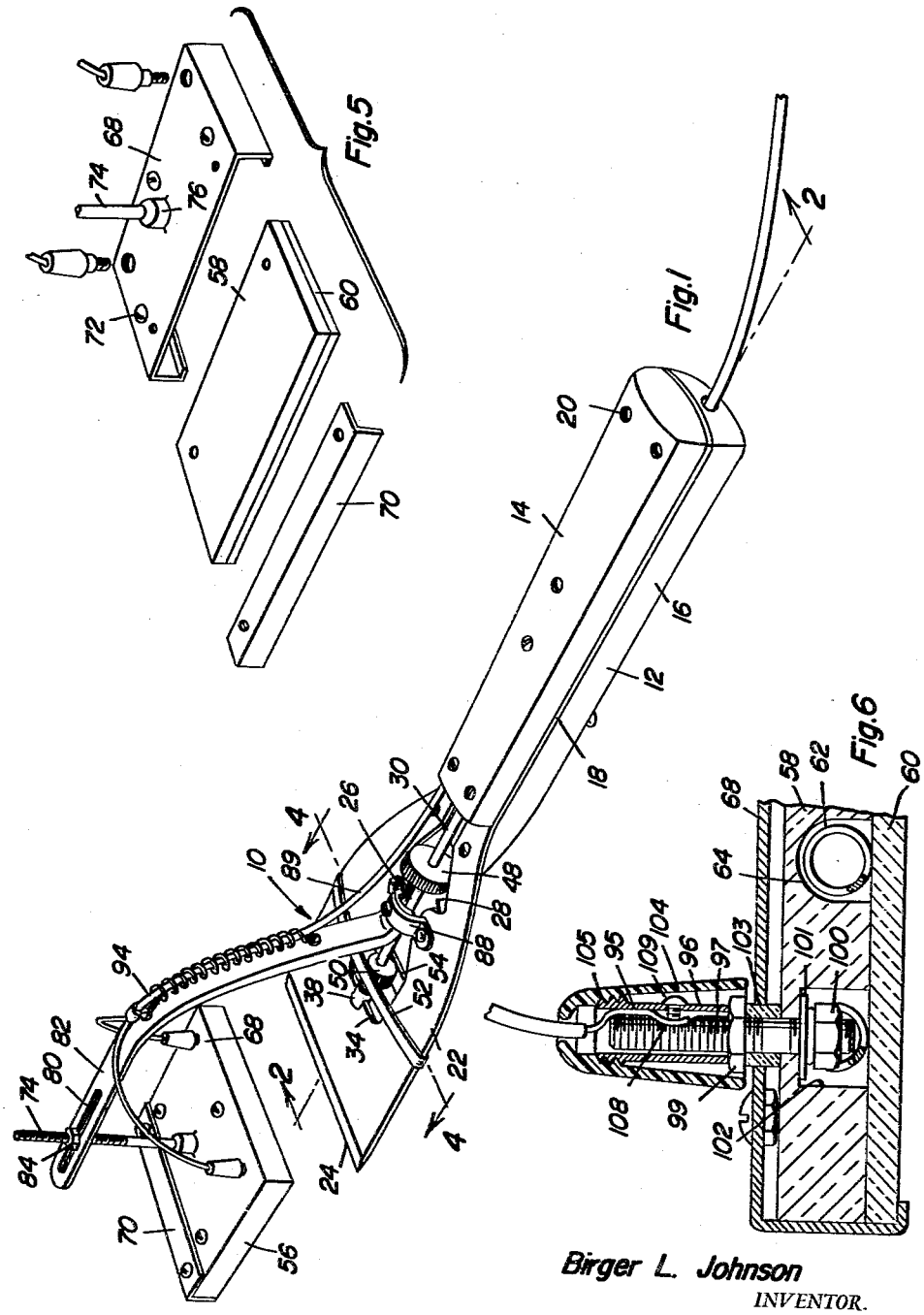
Birger L. Johnson
INVENTOR.

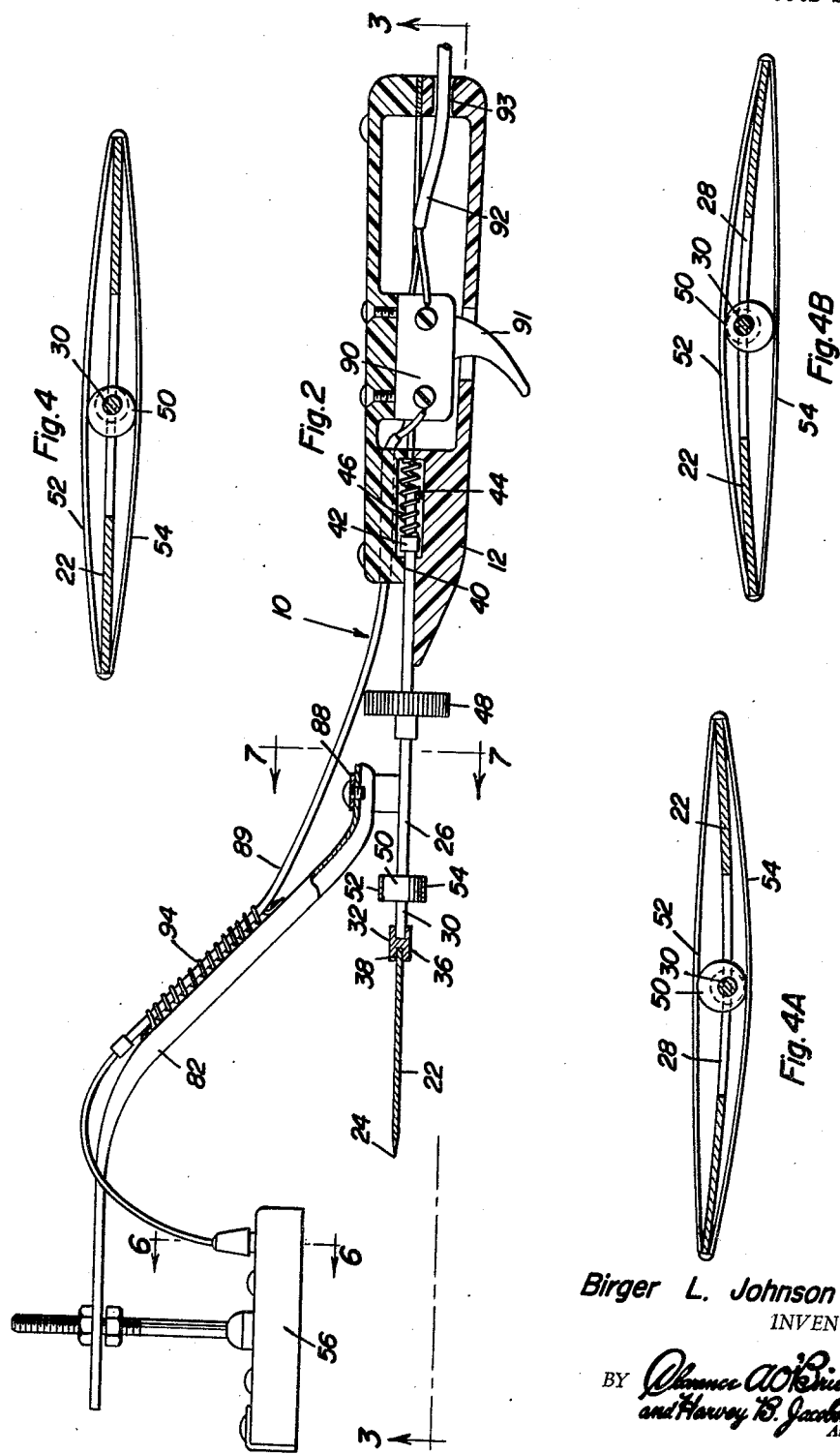

May 22, 1962　　　B. L. JOHNSON　　　3,036,190
PAINT AND VARNISH SCRAPER
Filed Nov. 27, 1959　　　　　　　　　　3 Sheets-Sheet 3
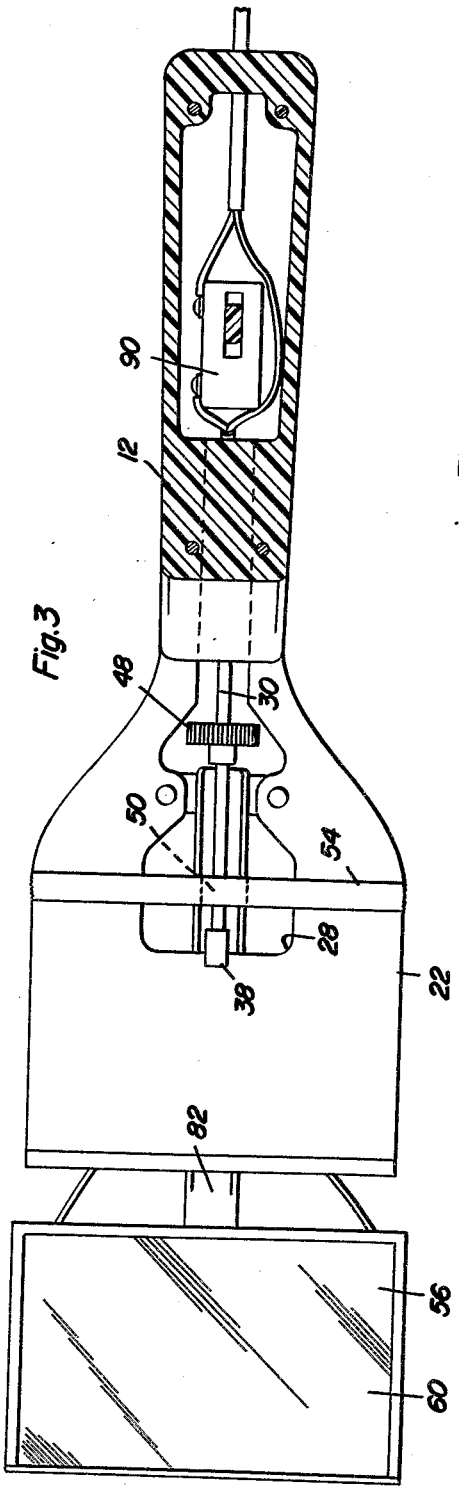
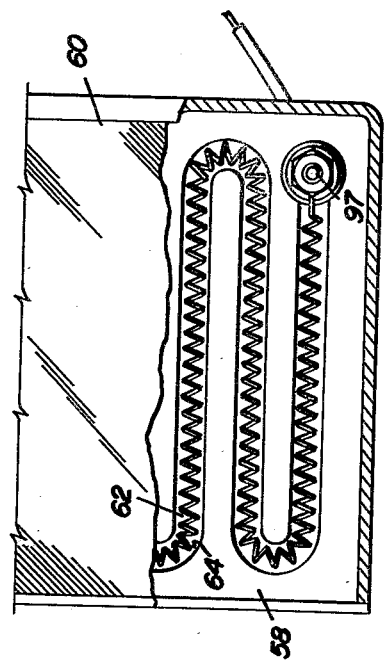
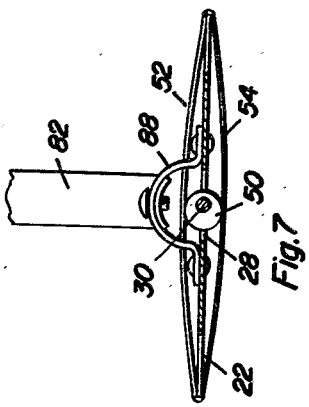
Birger L. Johnson
INVENTOR.

3,036,190
PAINT AND VARNISH SCRAPER
Birger L. Johnson, 722 S. 7th Ave., Bozeman, Mont.
Filed Nov. 27, 1959, Ser. No. 855,642
10 Claims. (Cl. 219—29)

This invention relates to scrapers and more particularly to a scraper providing general improvements in scrapers which are principally useful for scraping paint, varnish and the like.

The invention provides improvements in scrapers of the general type disclosed in my prior Patent No. 2,434,244, dated January 13, 1947.

An important feature of the invention is found in a blade flexing mechanism which is manually adjustable to require the blade to conform to surfaces which are slightly concave or convex which are so often found in house siding.

Another important feature of the invention is the heater, how it is constructed and arranged and its method of support in advance of the blade.

Accordingly, an object of the invention is to provide structural improvements which result in operational advantages over prior scrapers.

Briefly, the invention is embodied in a manually usable scraper which has a handle and a blade together with a heater supported above and in advance of the blade in order to heat the surface which is to be scraped. The heater is adjustably supported so that it may be arranged with reference to the blade, in selected positions in accordance with the desires of the user. The blade is of a flexible nature, for instance, it may be made of flexible metal or of special high heat resistant plastic. It is transversely flexible so that the edge of the blade, together with the material of the blade adjacent to the edge, are capable of assuming various curvatures in accordance with the desires and needs of the user.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the scraper in accordance with the invention.

FIGURE 2 is a sectional view taken on the line 2—2 of FIGURE 1.

FIGURE 3 is a sectional view taken approximately on the line 3—3 of FIGURE 2.

FIGURE 4 is a transverse sectional view taken on the line 4—4 of FIGURE 1.

FIGURE 4A is a sectional view similar to FIGURE 4 but showing a first position of adjustment of the blade.

FIGURE 4B is a transverse sectional view similar to FIGURE 4 but showing another adjusted position of the blade.

FIGURE 5 is an exploded perspective view of the heater.

FIGURE 6 is a sectional view taken on the line 6—6 of FIGURE 2 on an enlarged scale.

FIGURE 7 is a sectional view taken on the line 7—7 of FIGURE 2.

FIGURE 8 is a fragmentary elevational view with parts broken away in section to expose parts of the heater.

In the accompanying drawings there is an illustration of a paint and varnish scraper 10 which exemplifies the invention. The paint and varnish scraper is made of a handle 12 which may assume any configuration but which is made preferably of a substantial percentage of heat insulating material. Accordingly, handle 12 has an upper handle section 14 and a lower handle section 16 made of plastic or wood, and a flat metallic strip 18 interposed therebetween and held in place by standard fasteners, for example, screws 20 which engage handle sections 14 and 16. The flat metallic strip 18 is a continuation of blade 22 which is comparatively broad and which is also essentially flat in the rest position. As indicated previously, the blade and strip 18 may be made of a plastic, provided that the plastic possesses the necessary flexing qualities and characteristics which will be explained in more detail subsequently. The front edge 24 of the blade 22 is feathered for effective scraping.

Blade flexing mechanism 26 is operatively connected with the blade. An axially arranged opening 28 is formed in the blade between the side edges thereof, and the mechanism 26 is located for the most part in the opening 28. It is made of a spindle, shaft or shank 30 having a bearing 32 at the outer end thereof in engagement with the front edge 34 of opening 28, i.e., the material of the blade surrounding the opening. The bearing is made of member 36 having a slot 38 at one end within which the portion of the material at edge 34 of the opening of blade 22 is seated. The spindle extends through a bore 40 at the forward part of handle 12 and has a collar 42 attached thereto and located in counterbore 44 arranged as a longitudinal extension of bore 40 (FIGURE 2). Spring 46 is concentrically mounted on the inner end of shank 30 and bears at one end against collar 42 and at the other end on the inner wall of counterbore 44. Consequently, the shank 30 is mounted for rotational movement with respect to the handle 12 and also with respect to the blade 22.

Hand wheel 48 is fixed to shank 30 intermediate the ends thereof and is located in opening 28. Eccentric 50 is also fixed to the shank or spindle 30 so that it is capable of being turned when the spindle 30 is turned by the use of the hand wheel 48.

Two flat and flexible strips 52 and 54 extend transversely of the blade 22 and are secured to the opposite longitudinal edges thereof. Strips 52 and 54 extend over and under cam 50 respectively, and they are slightly bowed or arched. As pictorially represented in FIGURES 4, 4A and 4B, rotation of the cam or eccentric 50 will cause the strips 52 and 54 to be drawn tight and allowed to become loose simultaneously resulting in transverse flexure of blade 22.

Heater 56 is adjustably mounted above and in advance of the blade 22. The heater is made of a ceramic plate 58 and a high heat resistant but high infra-red transparent panel 60 superposed thereon. An infra-red heating coil 62 is mounted in a trough 64 opening through one face of ceramic plate 58 (FIGURES 6 and 8). An essentially U-shaped body or inverted channel member 68 receives the laminate formed of ceramic plate 58 and panel 60, and the assembly is completed by an angle strip 70 at the forward edge of the approximately channel-shaped body 68. Standard fasteners, for example, screws 72 engaged in the openings formed in body 68, strip 70 and the ceramic plate 58 hold the described parts of the heater assembled.

Threaded stud 74 is attached by a coupling 76 to body 68 and it extends through a slot 80 formed in mounting bracket 82. Nuts 84 threaded on stud 74 engage opposite surfaces of the bracket 82 adjacent to slot 80 thereby holding the heater 58 in a vertically adjusted position with respect to the mounting bracket 82. The inner end of the mounting bracket is secured to the small arched clamp 88 which spans opening 28 and which is secured, for instance, by rivets, screws, spot-welding, etc. to the blade 22 on the upper surface thereof. Bracket 82 extends upwardly and forwardly in a reasonably smooth curvature, from clamp 88 and also serves as a structural support for line conductor 89.

The line conductor is connected at one end to a conventional switch 90 concealed within handle 12 and which is preferably equipped with a trigger actuator having trigger 91. Conductor 92 extends through an opening 93 at one end of handle 12 and is adapted to connect with a source of electrical potential. The conductor 92 is operatively connected to switch 90. Conductor 89 which extends from the switch 90 is passed through a coil guide 94 attached to bracket 82, and it has two identical connectors 95 (FIGURE 6) at the ends of the wires thereof. Connector 95 is made of a sleeve 96 and threaded binding post 97 held fastened to body 68 by means of nuts 99 and 100 threaded thereon, one bearing against washer 101 in a recess 102 formed in the ceramic plate 58 and the other nut 99 bearing against an insulating bushing 103 located in an opening in the top of body 68 and bearing against the innermost surface of ceramic plate 98. An insulating shroud 104 is connected, for instance, by threads 105 to sleeve 96 and it provides a protective cover for the binding post 97. The binding post has a recess 108 in one side thereof, in which the conductor is adapted to seat. Setscrew 109 carried by sleeve 97 bears against the conductor and holds it firmly fastened in contact with the binding post 97.

In use, the heater is adjusted in accordance with the prerogative of the user. Then the scraper is used as any other ordinary paint or varnish scraper. However, by a simple manipulation of hand wheel 48, for example, by the finger or thumb of the user, the blade may be flexed transversely to conform to the contour being scraped. Further, coupling 76 supporting the heater 56 may be a swivel coupling so that as the scraper is tilted, the heater will remain horizontal, this obviously being only one possibility for horizontal work. Coupling 76 may be a fixed coupling for vertical or angular work, but in either case adjustment of the stud 74 will enable the heater to be located at any selected distance with reference to the work as the blade 22 is being used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A paint and varnish scraper comprising the combination of a handle, a transversely flexible blade connected with said handle, means connected with said blade for flexing said blade, said blade flexing means including a flexible strip extending transversely across the blade and secured to the blade at the ends of the strip, and a cam rotatably mounted on the blade and reacting on said strip to deform said strip.

2. A paint and varnish scraper comprising the combination of a handle, a transversely flexible blade connected with said handle, means connected with said blade for flexing said blade, said blade flexing means including a flexible strip extending transversely across the blade and secured to the blade at the ends of the strip, and a member reacting on said strip to deform said strip, a flexible second strip superposed with respect to said first strip and on the opposite side of the blade and in contact with said member.

3. The subject matter of claim 2 wherein said blade flexing means further includes a spindle attached to said member, and means mounting said spindle for rotation in said handle.

4. The subject matter of claim 3 wherein said blade has an opening therein and said spindle has a bearing at the forward end thereof and in engagement with the portion of the blade adjacent to the forward end of said opening in the blade.

5. The subject matter of claim 4 together with a heater, and means mounting said heater above and in advance of said blade.

6. The subject matter of claim 1 together with a heater, and means mounting said heater above and in advance of said blade.

7. The subject matter of claim 6 wherein there are means connected with said heater for adjusting the position of said heater with respect to said blade.

8. The subject matter of claim 1 wherein there is an electric heater, means securing said electric heater to the scraper in advance of said blade and above said blade, and a trigger operated switch means connected with said heater for controlling the energization of said heater.

9. A scraper comprising an elongated handle, a resilient blade on one end of said handle, said blade having an opening therein, a shaft rotatably mounted on the blade and traversing the opening, a pair of flexible strips bridging the opening on the opposite sides of the blade and having their end portions affixed thereto, and a cam on the shaft operable in the opening between the strips and engaged therewith for bending the blade in opposite directions.

10. A scraper comprising a handle, a blade on said handle, said blade having an opening therein, a pair of flexible strips bridging the opening and having their end portions affixed to the blade on opposite sides thereof, and a cam operable in the opening and engaged between the strips for flexing the blade in opposite directions.

References Cited in the file of this patent

UNITED STATES PATENTS

| | | |
|---|---|---|
| 1,534,953 | Hohman | Apr. 21, 1925 |
| 1,664,429 | Multhrup | Apr. 3, 1928 |
| 1,762,646 | Surls et al. | June 10, 1930 |
| 2,212,197 | Roesch et al. | Aug. 20, 1940 |
| 2,434,244 | Johnson | Jan. 13, 1948 |
| 2,756,499 | Liesunaitis | July 31, 1956 |
| 2,799,765 | Jenkins et al. | July 16, 1957 |
| 2,821,017 | Liesunaitis | Jan. 28, 1958 |

FOREIGN PATENTS

| | | |
|---|---|---|
| 471,706 | Germany | Feb. 16, 1929 |